United States Patent
Zhu et al.

(10) Patent No.: US 10,295,854 B2
(45) Date of Patent: May 21, 2019

(54) TOUCH DISPLAY PANEL AND PREPARATION METHOD THEREFOR, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kunpeng Zhu, Beijing (CN); Inho Park, Beijing (CN); Kai Diao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/525,831

(22) PCT Filed: Oct. 9, 2016

(86) PCT No.: PCT/CN2016/101544
§ 371 (c)(1),
(2) Date: May 10, 2017

(87) PCT Pub. No.: WO2017/059810
PCT Pub. Date: Apr. 13, 2017

(65) Prior Publication Data
US 2017/0336664 A1 Nov. 23, 2017

(30) Foreign Application Priority Data
Oct. 10, 2015 (CN) .......................... 2015 1 0653882

(51) Int. Cl.
*G06F 3/041* (2006.01)
*G02F 1/1333* (2006.01)

(52) U.S. Cl.
CPC ........ *G02F 1/13338* (2013.01); *G06F 3/0412* (2013.01); *G02F 2201/50* (2013.01);
(Continued)

(58) Field of Classification Search
CPC ........................ G06F 3/0412; G02F 1/13338
(Continued)

(56) References Cited

U.S. PATENT DOCUMENTS 5,663,748 A * 9/1997 Huffman ............. G06F 15/0283
345/173
8,294,843 B2 * 10/2012 Hollaway ......... G02F 1/133308
345/173
(Continued)

FOREIGN PATENT DOCUMENTS

| CN | 102122093 A | 7/2011 |
|----|-------------|--------|
| CN | 102308328 A | 1/2012 |

(Continued)

OTHER PUBLICATIONS

The First Chinese Office Action dated Sep. 1, 2017; Appln. No. 201510653882.6.
(Continued)

*Primary Examiner* — Prabodh M Dharia
(74) *Attorney, Agent, or Firm* — Ladas & Parry LLP

(57) ABSTRACT

A touch display panel and a preparation method therefor, and a display device are provided. The touch display panel includes a display panel, a touch control panel arranged on the display panel and an edge protection layer. The projection of the touch control panel on the display panel is located in the display panel, and the edge protection layer is arranged around the touch control panel.

19 Claims, 4 Drawing Sheets

(52) U.S. Cl.
CPC .............. *G06F 2203/04103* (2013.01); *G06F 2203/04107* (2013.01)

(58) Field of Classification Search
USPC ..... 345/156–184; 349/12, 139; 257/40, 782; 200/600
See application file for complete search history.

(56) References Cited

U.S. PATENT DOCUMENTS

| | | | | |
|---|---|---|---|---|
| 8,446,363 | B1 * | 5/2013 | Queru ................. | G06F 3/04883 345/1.2 |
| 2005/0184965 | A1 * | 8/2005 | Geaghan ................ | G06F 3/045 345/173 |
| 2006/0077544 | A1 * | 4/2006 | Stark ................... | G02F 1/13336 359/448 |
| 2006/0148971 | A1 * | 7/2006 | Jing .................... | C08J 3/005 524/520 |
| 2008/0259261 | A1 * | 10/2008 | Park ................... | G02F 1/134363 349/139 |
| 2010/0110033 | A1 * | 5/2010 | Sakai .................. | G06F 3/045 345/173 |
| 2011/0148819 | A1 * | 6/2011 | Yu ..................... | G06F 3/0428 345/175 |
| 2011/0254778 | A1 * | 10/2011 | Wang .................. | G06F 3/041 345/173 |
| 2011/0285934 | A1 | 11/2011 | Watanabe | |
| 2012/0044160 | A1 * | 2/2012 | Lan .................... | G06F 3/044 345/173 |
| 2012/0162563 | A1 | 6/2012 | Lai et al. | |
| 2012/0256851 | A1 * | 10/2012 | Wang .................. | G06F 3/041 345/173 |
| 2012/0268402 | A1 * | 10/2012 | Wang .................. | G06F 3/041 345/173 |
| 2012/0319116 | A1 * | 12/2012 | Ono ................... | H01L 27/3276 257/59 |
| 2013/0279177 | A1 | 10/2013 | Moriwaki et al. | |
| 2013/0299808 | A1 * | 11/2013 | Sugimoto ........... | H01L 27/3258 257/40 |
| 2014/0047708 | A1 * | 2/2014 | Chae .................. | H04W 4/00 29/700 |
| 2014/0049892 | A1 * | 2/2014 | Huang ................ | G06F 3/044 361/679.21 |
| 2014/0078419 | A1 * | 3/2014 | Lin ..................... | G06F 1/1692 349/12 |
| 2014/0092325 | A1 * | 4/2014 | Chen .................... | G06F 1/1692 349/12 |
| 2014/0118902 | A1 | 5/2014 | Kim | |
| 2014/0159255 | A1 * | 6/2014 | Li ..................... | H01L 23/60 257/782 |
| 2014/0184952 | A1 * | 7/2014 | Chu ................... | G06F 3/042 349/12 |
| 2014/0367242 | A1 * | 12/2014 | Chen .................. | H03K 17/9622 200/600 |
| 2015/0092306 | A1 * | 4/2015 | Hou ................... | G06F 3/041 361/42 |
| 2015/0131025 | A1 * | 5/2015 | Ota ..................... | G02F 1/133512 349/58 |
| 2015/0336664 | A1 * | 11/2015 | Rauber .................. | B64C 27/54 416/1 |
| 2016/0062516 | A1 * | 3/2016 | Jeong .................... | G06F 3/044 345/174 |
| 2016/0224168 | A1 * | 8/2016 | Watanabe ............ | G06F 3/0414 |
| 2016/0327699 | A1 | 11/2016 | Li et al. | |
| 2016/0370892 | A1 * | 12/2016 | Chang .................. | G06F 3/0416 |
| 2017/0060183 | A1 * | 3/2017 | Zhang ................... | G06F 1/1605 |

FOREIGN PATENT DOCUMENTS

| | | |
|---|---|---|
| CN | 103299356 A | 9/2013 |
| CN | 104049827 A | 9/2014 |
| CN | 104133310 A | 11/2014 |
| CN | 204009805 U | 12/2014 |
| CN | 104332107 A | 2/2015 |
| CN | 104432107 A | 3/2015 |
| CN | 104460084 A | 3/2015 |
| CN | 104503115 A | 4/2015 |
| CN | 105182590 A | 12/2015 |

OTHER PUBLICATIONS

ISR and Written Opinion dated Dec. 28, 2016; PCT/CN2016/101544.
The Second Chinese Office Action dated Apr. 4, 2018; Appln. No. 201510653882.6.

* cited by examiner

TOUCH DISPLAY PANEL AND PREPARATION METHOD THEREFOR, AND DISPLAY DEVICE

TECHNICAL FIELD

Embodiments of the present invention relate to a touch display panel and manufacturing method thereof and a display device.

BACKGROUND

An existing touch display device comprises two parts including a touch panel and a display panel. The touch panel generally employs On Cell Touch technology; for example, an On-Cell touch panel may include a touch substrate and a protection glass, the touch substrate is generally glass material, and provided with a touch control circuit thereon, the protection glass is covered on the touch substrate to protect the touch substrate. The display panel may be a TFT-LCD panel, or an OLED panel. Taking a TFT-LCD panel as an example, a TFT-LCD panel generally includes an array substrate and a color filter substrate which are cell-assembled, and a liquid crystal layer located between the array substrate and the color filter substrate. In a case where the display panel is a TFT-LCD panel, the display device further comprises a backlight source, which is located under the display panel and used to provide light for the display panel.

SUMMARY

Embodiments of the present invention provide a touch display panel and manufacturing method thereof and a display device. The touch display panel can reduce the probability of the breaking of a display panel, realize relative low thickness and weight, and achieve better touch sensitivity and response speed.

At least one embodiment of the present invention provides a touch display panel, including a display panel; a touch panel, disposed on the display panel; and an edge protection layer, wherein a projection of the touch panel on the display panel is located within the display panel, the edge protection layer is disposed to surround the touch panel.

For example, in the touch display panel provided by one embodiment of the present invention, the edge protection layer is configured to refract light going through the edge protection layer to realize an effect of no frame.

For example, in the touch display panel provided by one embodiment of the present invention, the edge protection layer covers a region from an edge of the touch panel to an edge of the display panel, and a thickness of the edge protection layer gradually reduces along a direction from the edge of the touch panel to the edge of the display panel.

For example, in the touch display panel provided by one embodiment of the present invention, a surface of the edge protection layer away from the display surface has an arc shape.

For example, in the touch display panel provided by one embodiment of the present invention, a thickness of a joint of the edge protection layer and the touch panel is equal to a thickness of the touch panel.

For example, in the touch display panel provided by one embodiment of the present invention, the edge protection layer is transparent.

For example, in the touch display panel provided by one embodiment of the present invention, the touch panel comprises a base substrate and a touch circuit disposed on the base substrate, a refractive index of the edge protection layer is equal to a refractive index of the base substrate.

For example, in the touch display panel provided by one embodiment of the present invention, the base substrate is a glass substrate, the refractive index of the edge protection layer is equal to a refractive index of glass used to prepare the glass substrate.

For example, in the touch display panel provided by one embodiment of the present invention, a material of the edge protection layer comprises transparent resin.

For example, in the touch display panel provided by one embodiment of the present invention, the transparent resin is epoxy resin.

For example, in the touch display panel provided by one embodiment of the present invention, the display panel comprises a display region and a frame non-display region surrounding the display region, the display region comprises a display main region and a frame adjacent region surrounding the display main region, a projection of the touch panel on the display panel is the same as the display main region, a projection of the edge protection layer on the display panel is the same as a combination of the frame non-display region and the frame adjacent region.

For example, in the touch display panel provided by one embodiment of the present invention, the frame non-display region is provided with a black matrix At least one embodiment of the present invention provides a manufacturing method of a touch display panel, comprising: providing a display panel and a touch panel; laminating the display panel and the touch panel; and forming an edge protection layer around edges of the touch panel.

For example, in the manufacturing method of a touch display panel provided by one embodiment of the present invention, further comprising: coating transparent region around the edges of the touch panel to form the edge protection layer.

For example, in the manufacturing method of a touch display panel provided by one embodiment of the present invention, the transparent resin comprises epoxy resin.

For example, in the manufacturing method of a touch display panel provided by one embodiment of the present invention, a thickness of the edge protection layer gradually reduces along a direction from an edge of the touch panel to an edge of the display panel.

For example, in the manufacturing method of a touch display panel provided by one embodiment of the present invention, a surface of the edge protection layer away from the display panel has an arc shape.

For example, in the manufacturing method of a touch display panel provided by one embodiment of the present invention, the touch panel comprises a base substrate and a touch circuit disposed on the base substrate, a refractive index of the edge protection layer is equal to a refractive index of the base substrate.

At least one embodiment of the present invention provides a display device, comprising a backlight source and any one of the abovementioned touch display panel.

For example, in the display device provided by one embodiment of the present invention, the backlight source comprises a light emitting surface, the display panel comprises a display region, the light emitting surface at least covers the display region of the display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention, for those skilled in the art, other drawings can be obtained according to these drawings without paying any inventive labor.

DRAWING SIGNS

Figure 1:
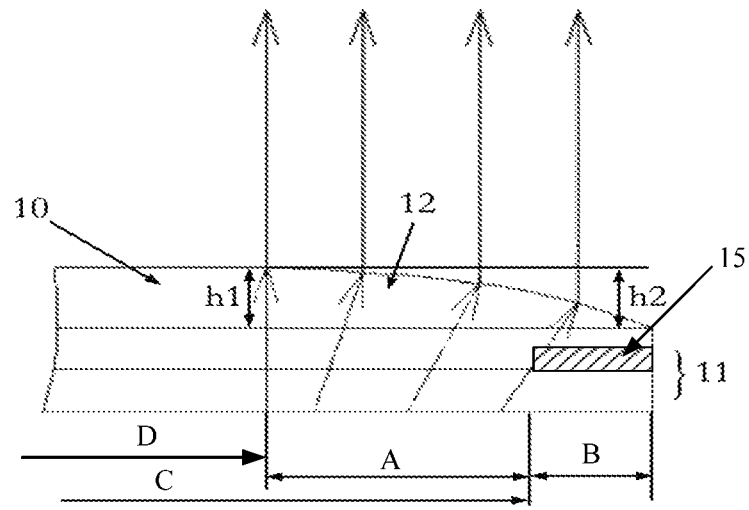
FIG. 1 is a schematic diagram of a touch display panel provided by the embodiments of the present invention.

5—backlight source; 10—touch panel; 11—display panel; 12—edge protection layer; 15—black matrix; 51—light emitting surface; 101—base substrate/glass substrate; 102—touch circuit; A—frame adjacent region; B—frame non-display region; C—display region; D—display main region.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure. Besides, thickness and shapes of films and layers in the drawings do not reflect a real proportion, and the purpose is to schematically illustrate the content of the present disclosure.

Unless otherwise defined, all the technical and scientific terms used herein have the same meanings as commonly understood by one of ordinary skill in the art to which the present disclosure belongs. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," etc., are not intended to define a physical connection or mechanical connection, but may include an electrical connection, directly or indirectly.

During the research, the inventors of the present invention notice that; in a touch display device, a touch substrate comprises a protection glass. Thus, the touch display device has relatively large overall thickness, in this way, at an aspect, the thickness and weight of the display device are increased, at another aspect, the sensitivity and response speed of the touch panel are reduced.

Embodiments of the present invention provide a touch display panel and manufacturing method thereof and a display device. The touch display panel comprises a display panel, a touch panel disposed on the display panel and an edge protection layer. A projection of the touch panel on the display panel is located within the display panel, and the edge protection layer is disposed to surround the touch panel. Therefore, the edge protection layer can play a function of protecting the touch panel, so as to omit the additional protection glass, so as to further reduce the thickness and weight of the touch display panel and improve the touch sensitivity of the touch display panel.

Hereafter, the touch display panel and manufacturing method and the display device provided by the embodiments of the present invention will be described with reference to the drawings.

First Embodiment

The present embodiment provides a touch display panel. FIG. 1 is a schematic diagram of a touch display panel provided by the present invention. As illustrated by FIG. 1, from the top to the bottom, the touch display panel comprises a touch panel 10 and a display panel 11, that is to say, the touch panel 10 is disposed on the display panel 11. A projection of the touch panel 10 on the display panel 11 is located within the display panel 11, i.e., an orthographic projection of the touch panel 10 on the display panel 11 is located within a region where the display panel 11 is located. Besides, the touch display panel further comprises an edge protection layer 12, the edge protection layer 12 is disposed to surround the touch panel 10.

Generally, the touch panel comprises a glass substrate and a touch circuit disposed on the glass substrate. Because glass material is easy to break, a surface of the touch panel is needed to be provided with a protection glass (high strength glass). However, in the touch display panel provided by the present embodiment, the edge protection layer 12 around the edges of the touch panel 10 can protect the touch panel 10; in this way, upon the touch display panel dropping down, the edge protection layer 12 can contact an external object, so as to prevent the touch panel 10 contacting the external object, so as to further reduce the probability of the breaking of the touch panel 10. Therefore, it is not necessary for the touch display panel provided by the present embodiment to dispose a protection glass to protect the touch panel 10, and the thickness and weight of the touch display panel are reduced; meanwhile, after removing the protection glass, the touch panel 10 can response touch movement of user more sensitively and more quickly, so as to improve the sensitivity and response speed of the touch display panel.

For example, in the touch display panel provided by an exemplary example of the present embodiment, as illustrated by FIG. 1, the edge protection layer 12 is used to refract light going through the edge protection layer 12, so as to realize an effect of no frame.

For example, in the touch display panel provided by an exemplary example of the present embodiment, the edge protection layer 12 covers a region between an edge of the touch panel 10 and an edge of the display panel 11, and the thickness of the edge protection layer 12 gradually reduces along a direction from the edge of the touch panel 10 to the edge of the display panel 11. Generally, the edge of the display panel is used for the arrangement of wires, disposure of driving control circuit and the like. Therefore, these regions are covered with a black matrix, thus, in a normal display panel, light emitted from the backlight source cannot directly pass through the frame black matrix of the display panel, and a black frame appears around the display region of the display panel. As illustrated by FIG. 1, the display panel 11 comprises a display region C and a frame non-display region B surrounding the display region C. The display region C can effectively display, and the frame non-display region B cannot display due to the black matrix. However, in the touch display panel provided by the present embodiment, along a direction from the edge of the touch panel 10 to the edge of the display panel 11, the thickness of the edge protection layer 12 gradually reduces. Based on the this kind of structure, a part of the light emitted from the backlight source to the edge of the display region (i.e., region A in FIG. 1, a region of the display region adjacent to the frame non-display region) obliquely shines the edge arc portion of the display panel, i.e., the edge protection layer, and is emitted upward (along a direction perpendicular to the display panel 11) after the refraction of the edge protection layer whose thickness gradually reduces along a direction from the edge of the touch panel to the edge of the display panel, so as to allow the frame non-display region to display an image, so as to reduce and even eliminate the frame, and further realize the effect of no frame display.

For example, in the touch display panel provided by an exemplary example of the present embodiment, as illustrated by FIG. 1, a surface of the edge protection layer 12 away from the display panel 11 has an arc shape. Because the surface of the edge protection 12 away from the display panel 11 has an arc shape, the thickness of the edge protection layer 12 gradually reduces along a direction to an edge of the display panel 11, so as to realize the effect of no frame display. Besides, because the surface of the edge protection layer 12 away from the display panel 11 has an arc shape, the thickness of the edge protection layer 12 can continuously change, such that the deformation of the image displayed by the region A of the display region C adjacent to the frame non-display region B is relatively small, so as to improve the display effect of the touch display panel. Certainly, the embodiments of the present invention comprise but are not limited thereto, and the edge protection layer can further adopt other structures whose thickness gradually reduces.

For example, as illustrated by FIG. 1, the display panel 11 comprises a display region C and a frame non-display region B. The display region C comprises a display main region D and a frame adjacent region A surrounding the display main region D, the frame adjacent region A is a region adjacent to the frame non-display region B. A projection of the touch panel 10 on the display panel 11 is the same as the display main region D; a projection of the edge protection layer 12 on the display panel 11 is the same as a combination of the frame non-display region B and the frame adjacent region A.

For example, as illustrated by FIG. 1, the frame non-display region B (a region marked in FIG. 1) is provided with a black matrix 15.

Figure 6:
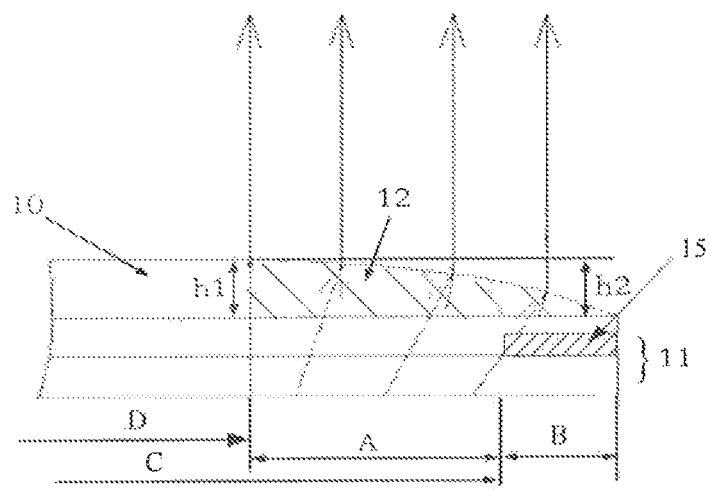
FIG. 6 is a schematic diagram of a touch display panel provided by the embodiments of the present invention.

For example, in the touch display panel provided by an exemplary example provided by the present embodiment, the thickness h2 of the part of the edge protection layer 12 (as shown in FIG. 6 in shadow) connected with the touch panel 10 is equal to the thickness h1 of the touch panel 10. In this way, the transition of the joint of the surface of the edge protection layer 12 away from the display panel 11 and the surface of the touch panel 10 away from the display panel is smoother, which helps to realize a better display effect.

For example, in the touch display panel provided by an exemplary example provided by the present embodiment, the edge protection layer 12 is transparent. Thus, the edge protection layer can realize a better protection effect and no frame display.

For example, the material of the edge protection layer 12 can be selected as transparent resin, for example, epoxy resin.

Figure 2:
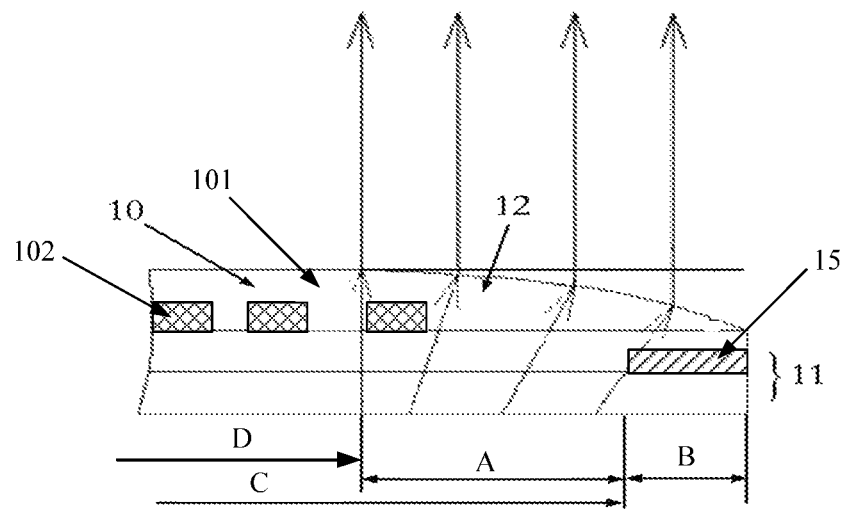
FIG. 2 is a schematic diagram of another touch display panel provided by the embodiments of the present invention.

For example, as illustrated by FIG. 2, the touch panel 10 comprises a base substrate 101 and a touch circuit 102 disposed on the base substrate 101, a refractive index of the edge protection layer 12 is equal to that of the base substrate 101. Thus, light emitted from the backlight source have the same transmittances in the edge protection layer 12 and the touch panel 10 (base substrate 101), so as to avoid differences of brightness between the display region corresponding to the edge protection layer 12 and the display region corresponding to the touch panel 10 (base substrate 101) and the resultant display defects.

For example, the base substrate is a glass substrate, that is to say, the touch panel 10 comprises a glass substrate 101 and the touch circuit 102 disposed on the glass substrate 101, a refractive index of the edge protection layer 12 is equal to that of the glass substrate 101. Thus, light emitted from the backlight source have the same transmittances in the edge protection layer 12 and the touch panel 10, so as to avoid differences of brightness between the display region corresponding to the edge protection layer 12 and the display region corresponding to the touch panel 10 (base substrate 101) and the resultant display defects.

For example, the surface of the touch panel 10 may be a plane or a curved surface, that is to say, the touch panel 10 may be 2D glass, 2.5D glass or 3D glass. Upon adopting 2D glass, the touch panel can realize relatively low costs; upon adopting 2.5D glass or 3D glass, the touch panel can achieve a relatively good display effect.

In the touch display panel provided by the present embodiment, an edge of the touch panel 10 is located within an edge of the display panel 11, an edge protection layer 12 is disposed to surround the touch panel 10, and the edge protection layer 12 is used to protect the touch panel 10. In this way, upon the touch display dropping down, the edge protection layer 12 can prevent the touch panel 10 being damaged by colliding an external object; therefore, the probability of the breaking of the touch display panel provided by the present embodiment upon being collided by an external object is reduced. Meanwhile, it is not necessary for the touch display panel provided by the present embodiment to dispose a protection glass to protect the touch panel 10, such that the thickness and weight of the touch display panel is reduced; meanwhile, after removing the protection glass, the touch panel 10 can respond the touch movement of user more sensitively and more quickly, so as to improve the sensitivity and response speed of the touch display panel.

Second Embodiment

Figure 3:
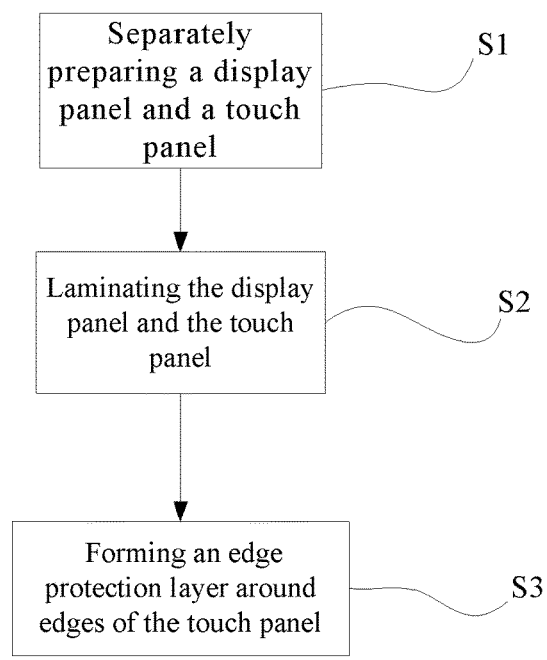
FIG. 3 is a flow diagram of a manufacturing method of a touch display panel provided by the embodiments of the present invention.

The present embodiment provides a manufacturing method of a touch display panel, used to prepare the abovementioned touch display panel. FIG. 2 is a flow diagram of a manufacturing method of a touch display panel; as illustrated by FIG. 3, the manufacturing method of a touch display panel comprises the following steps S1-S3:

S1: Separately preparing a display panel and a touch panel;

S2: Laminating the display panel and the touch panel; and

S3: Forming an edge protection layer around edges of the touch panel.

For example, the edge protection layer illustrated by FIG. 1 can be formed by coating transparent resin around edges of the touch panel.

For example, the transparent resin may comprise epoxy resin, certainly, the embodiments of the present invention comprise but are not limited thereto.

In the manufacturing method of a touch display panel provided by the present embodiment, the prepared touch display panel comprises an edge protection layer, at an aspect, the probability of the breaking of the touch display panel can be reduced; at another aspect, the protection glass can be omitted, and the overall thickness and weight of the touch display panel can be reduced to realize lightening and thinning, and the touch sensitivity of the touch display panel can be improved.

For example, in the manufacturing method of a touch display panel provided by an exemplary example of the present embodiment, the thickness of the edge protection gradually reduces along a direction from an edge of the touch panel to an edge of the display panel. Therefore, the touch display panel prepared by the method can reduce and even eliminate the frame, so as to realize no frame display, and the detailed description may refer to the relevant description in the first embodiment.

For example, in the manufacturing method of a touch display panel provided by an exemplary example of the present embodiment, a surface of the edge protection layer away from the display panel has an arc shape. Because the surface of the edge protection layer away from the display panel has an arc shape, the thickness of the edge protection layer can continuously change, so as to improve the display effect of the touch display panel.

For example, in the manufacturing method of a touch display panel provided by an exemplary example of the present embodiment, the touch panel comprises a base substrate and a touch circuit disposed on the base substrate, a refractive index of the edge protection layer is the same as the base substrate. Therefore, light emitted from a backlight source has the same transmittances in the edge protection layer and the touch panel (base substrate), so as to avoid the differences of brightness between the display region corresponding to the edge protection layer and the display region corresponding to the touch panel (base substrate) and the resultant display defects.

Third Embodiment

Figure 4:
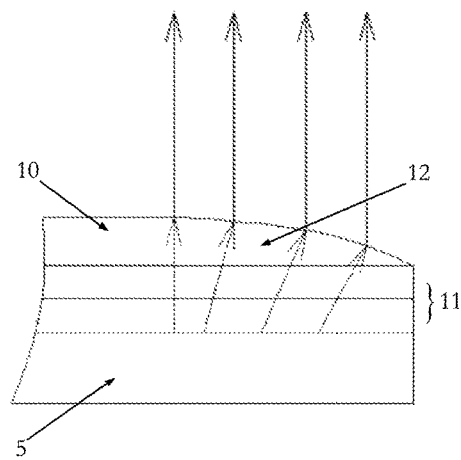
FIG. 4 is a schematic diagram of a display device provided by the embodiments of the present invention.

The present embodiment provides a display device. FIG. 4 is a schematic diagram of a display device. As illustrated by FIG. 4, the display device comprises a backlight source 5 and the abovementioned touch display panel. Because the display device includes the abovementioned touch display panel, the display device has the technical effect corresponding to the technical effect of the touch display panel which the display device comprises. The display device provided by the present embodiment can reduce the probability of the breaking of the display panel, realize relatively low thickness and weight, and achieve a better touch sensitivity and response speed. The detailed description can refer to the relevant description in the first embodiment, and the repeated portions are omitted in the embodiments of the present invention.

Figure 5:
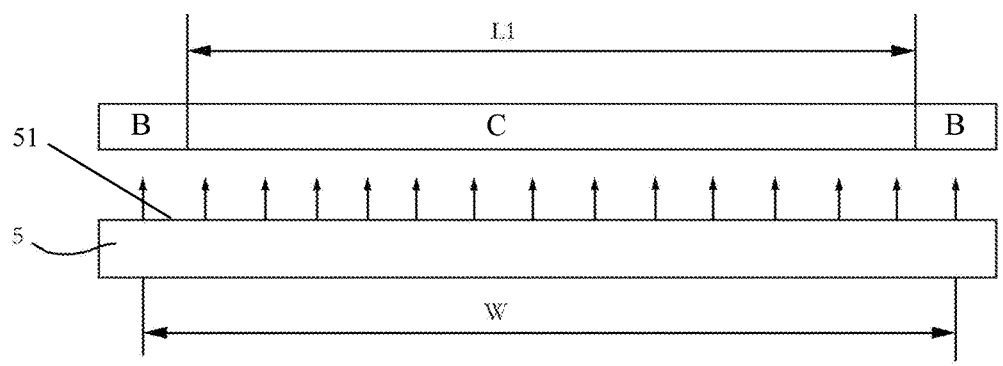
FIG. 5 is a schematic diagram of a light emitting surface of the display device illustrated by FIG. 4.

For example, the backlight source 5 comprises a light emitting surface 51, the display panel comprises a display region C, the light emitting surface 51 at least covers the display region C of the display panel, as illustrated by FIG. 5. That is to say, the light emitting surface 51 of the backlight source 5 have a certain width, the width W is larger than the distance L1 (i.e., a width of the display region C) between the frame black matrixes of two opposite edges of the display panel, in this way, it can be guaranteed that the edge region of the backlight source 5 can emit enough light, and the light shines a region corresponding to the edge protection layer 12, so as to realize no frame display, and the display brightness of the frame and the brightness of the display region corresponding to the touch panel 10 are basically the same.

The foregoing are merely specific embodiments of the disclosure, but not limitative to the protection scope of the present disclosure. One skilled in the art could devise variations or modifications to the present invention that within the scope and the spirit of the present invention. Therefore, the protection scope of the disclosure should be defined by the accompanying claims.

The present disclosure claims the benefits of Chinese patent application No. 201510653882.6, which was filed on Oct. 10, 2015 and is incorporated in its entirety herein by reference as part of this application.

The invention claimed is:

1. A touch display panel, comprising:
a display panel;
a touch panel, disposed on the display panel; and
an edge protection layer,
wherein a projection of the touch panel on the display panel is located within the display panel, the edge protection layer is disposed to surround the touch panel, and the projection of the touch panel on the display panel is not overlapped with a projection of the edge protection layer on the display panel,
the edge protection layer is configured to refract light going through the edge protection layer so that a part of the light emit from the edge protection layer in a direction perpendicular to the display panel to realize an effect of no frame.

2. The touch display panel according to claim 1, wherein the edge protection layer covers a region from an edge of the touch panel to an edge of the display panel, and a thickness of the edge protection layer gradually reduces along a direction from the edge of the touch panel to the edge of the display panel.

3. The touch display panel according to claim 2, wherein a surface of the edge protection layer away from the display surface has arc shape.

4. The touch display panel according to claim 2, wherein a thickness of a part of the edge protection layer connected to the touch panel is equal to a thickness of the touch panel.

5. The touch display panel according to claim 1, wherein the edge protection layer is transparent.

6. The touch display panel according to claim 5, wherein a material of the edge protection layer comprises transparent resin.

7. The touch display panel according to claim 1, wherein the touch panel comprises a base substrate and a touch circuit disposed on the base substrate, a refractive index of the edge protection layer is equal to a refractive index of the base substrate.

8. The touch display panel according to claim 7, wherein the base substrate is a glass substrate, the refractive index of the edge protection layer is equal to a refractive index of glass used to prepare the glass substrate.

9. The touch display panel according to claim 1, wherein the display panel comprises a display region and a frame non-display region surrounding the display region, the display region comprises a display main region and a frame adjacent region surrounding the display main region, a projection of the touch panel on the display panel is the same as the display main region, a projection of the edge protection layer on the display panel is the same with a combination of the frame non-display region and the frame adjacent region.

10. The touch display panel according to claim 9, wherein the frame non-display region is provided with a black matrix.

11. The touch display panel according to claim 9, wherein the projection of the edge protection layer on the display panel is located on the display region close to an edge of the display panel.

12. A display device, comprising a backlight source and the touch display panel according to claim 1.

13. The touch display panel according to claim 1, wherein the edge protection layer directly contacts with a side surface of the touch panel.

14. A manufacturing method of a touch display panel, comprising:
    providing a display panel and a touch panel;
    laminating the display panel and the touch panel; and
    forming an edge protection layer around edges of the touch panel,
    wherein a projection of the touch panel on the display panel is not overlapped with a projection of the edge protection layer on the display panel,
    the edge protection layer is configured to refract light going through the edge protection layer so that a part of the light emit from the edge protection layer in a direction perpendicular to the display panel to realize an effect of no frame.

15. The manufacturing method of a touch display panel according to claim 14, further comprising:
    coating transparent region around the edges of the touch panel to form the edge protection layer.

16. The manufacturing method of a touch display panel according to claim 15, wherein the transparent resin comprises epoxy resin.

17. The manufacturing method of a touch display panel according to claim 14, wherein a thickness of the edge protection layer gradually reduces along a direction from an edge of the touch panel to an edge of the display panel.

18. The manufacturing method of a touch display panel according to claim 17, wherein a surface of the edge protection layer away from the display panel has an arc shape.

19. The manufacturing method of a touch display panel according to claim 14, wherein the touch panel comprises a base substrate and a touch circuit disposed on the base substrate, a refractive index of the edge protection layer is equal to a refractive index of the base substrate.

* * * * *